US012726061B2

(12) United States Patent
Shibayama et al.

(10) Patent No.: US 12,726,061 B2
(45) Date of Patent: Sep. 1, 2026

(54) ROTOR, MOTOR, AND ROTOR MANUFACTURING METHOD

(71) Applicant: KAWASAKI JUKOGYO KABUSHIKI KAISHA, Kobe (JP)

(72) Inventors: Yoshiyasu Shibayama, Kobe (JP); Keigo Imamura, Kobe (JP); Kazuki Ueta, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 239 days.

(21) Appl. No.: 18/685,325

(22) PCT Filed: Jun. 13, 2022

(86) PCT No.: PCT/JP2022/023672
§ 371 (c)(1),
(2) Date: Feb. 21, 2024

(87) PCT Pub. No.: WO2023/026640
PCT Pub. Date: Mar. 2, 2023

(65) Prior Publication Data

US 2025/0055333 A1 Feb. 13, 2025

(30) Foreign Application Priority Data

Aug. 24, 2021 (WO) .................. PCT/JP2021/031025

(51) Int. Cl.
*H02K 1/276* (2022.01)
*H01F 13/00* (2006.01)
(Continued)

(52) U.S. Cl.
CPC ......... *H02K 1/2766* (2013.01); *H01F 13/003* (2013.01); *H02K 15/03* (2013.01); *H02K 15/12* (2013.01)

(58) Field of Classification Search
CPC ........ H01F 13/003; H02K 1/27; H02K 1/276; H02K 1/2766; H02K 15/03; H02K 15/12; H02K 2213/03
See application file for complete search history.

(56) References Cited

U.S. PATENT DOCUMENTS 9,130,422 B2 9/2015 Rahman et al.
2008/0265706 A1 10/2008 Nakayama et al.
(Continued)

FOREIGN PATENT DOCUMENTS

JP S63-202006 A 8/1988
JP H04-145861 A 5/1992
(Continued)

OTHER PUBLICATIONS

Aug. 16, 2022 International Search Report issued in International Patent Application No. PCT/JP2022/023672.

*Primary Examiner* — Christopher M Koehler
*Assistant Examiner* — Ethan Nguyen Vo
(74) *Attorney, Agent, or Firm* — Oliff PLC

(57) ABSTRACT

Each permanent magnet of a rotor includes: a first and a second linear portion arranged in a circumferential direction and extending from an outer periphery side of a rotor core toward a rotation axis; a third linear portion located between the first and the second linear portion in the circumferential direction and extending obliquely with respect to a radial direction and separately from the rotation axis from an end of the first linear portion closer to the rotation axis; and a fourth linear portion located between the second and the third linear portion in the circumferential direction and extending obliquely with respect to the radial direction and separately from the rotation axis from an end of the second linear portion closer to the rotation axis. Thicknesses of the third linear portion and the fourth linear portion are smaller
(Continued)

than thicknesses of the first linear portion and the second linear portion.

8 Claims, 6 Drawing Sheets

(51) Int. Cl.
*H02K 15/03* (2025.01)
*H02K 15/12* (2025.01)

(56) References Cited

U.S. PATENT DOCUMENTS

| | | | |
|---|---|---|---|
| 2017/0170696 A1 | 6/2017 | Ogawa et al. | |
| 2020/0059125 A1* | 2/2020 | Gaussens | H02K 21/14 |

FOREIGN PATENT DOCUMENTS

| | | | | |
|---|---|---|---|---|
| JP | H08-256441 | A | | 10/1996 |
| JP | 2008295288 | A | * | 12/2008 |
| JP | 2014103741 | A | * | 6/2014 |
| JP | 2015-195650 | A | | 11/2015 |
| JP | 2016-152653 | A | | 8/2016 |
| JP | 6237412 | B2 | * | 11/2017 |
| WO | 2016/042720 | A1 | | 3/2016 |

* cited by examiner

H5 H6 91 43 44 42 41 41a 42a 42a 41a 92 42 41 H3 H4 45 46 94 99 3a 3 4 96 97 98 3b 93 31

ROTOR, MOTOR, AND ROTOR MANUFACTURING METHOD

FIELD

The technique disclosed here relates to hands and robot systems.

BACKGROUND

As disclosed in Patent Document 1, a rotor in which permanent magnets are embedded in a rotor core has been known to date. A rotor of this type rotates by magnetic attraction and repulsive forces occurring between a magnetic flux of a permanent magnet and a flux linkage of a stator.

CITATION LIST

Patent Document

Patent Document 1: International Patent Publication No. WO2016/042720

SUMMARY

In the rotor described above, motor characteristics can be enhanced by increasing effective magnetic fluxes of the rotor derived from the permanent magnets. A desirable technique for increasing effective magnetic fluxes of the rotor is to maximize the thickness of the permanent magnets in magnetization directions. However, if the thickness of the permanent magnets is increased, material costs for the permanent magnets will increase.

It is therefore an object of the technique disclosed here to enhance motor characteristics while reducing costs for permanent magnets.

A rotor disclosed here includes: a rotor core having a rotation axis; and permanent magnets arranged in a circumferential direction centered on the rotation axis in the rotor core, the permanent magnets having alternately different magnetic poles in the circumferential direction. Each of the permanent magnets includes, in a cross section orthogonal to the rotation axis, a first linear portion, a second linear portion, a third linear portion, and a fourth linear portion. The first linear portion and the second linear portion are arranged in the circumferential direction and extend from an outer periphery side of the rotor core toward the rotation axis. The third linear portion is located between the first linear portion and the second linear portion in the circumferential direction and extends obliquely with respect to a radial direction centered on the rotation axis and separately from the rotation axis from an end of the first linear portion closer to the rotation axis. The fourth linear portion is located between the second linear portion and the third linear portion in the circumferential direction and extends obliquely with respect to the radial direction and separately from the rotation axis from an end of the second linear portion closer to the rotation axis. A thickness of at least one of the third linear portion or the fourth linear portion is smaller than a thickness of each of the first linear portion and the second linear portion.

A motor disclosed here includes: a cylindrical stator; and the rotor located in the stator.

A rotor manufacturing method disclosed here is a method for manufacturing the rotor in which the permanent magnets are bonded magnets. The rotor manufacturing method includes: preparing the rotor core having arrangement holes for placing the bonded magnets, injecting a material for the bonded magnets into each of the arrangement holes of the rotor core, thereby injection molding the bonded magnets in a non-magnetized state; and in injection molding the bonded magnets in a non-magnetized state, placing orientation magnetic flux generators individually corresponding to the arrangement holes at an outer side and an inner side of the rotor core and orienting the bonded magnets in a non-magnetized state.

Another rotor manufacturing method is a method for manufacturing the rotor described above. This rotor manufacturing method includes: preparing the rotor core having arrangement holes for placing the permanent magnets; placing the permanent magnets in a non-magnetized state in the respective arrangement holes of the rotor core; and after placing the permanent magnets in a non-magnetized state, placing magnetization magnetic flux generators corresponding to the respective arrangement holes an outer side and an inner side of the rotor core and magnetizing the permanent magnets in a non-magnetized state.

The rotor described above can enhance motor characteristics with reduction of costs for the permanent magnets.

The motor described above can enhance motor characteristics with reduction of costs for the permanent magnets.

The rotor manufacturing method described above can enhance motor characteristics with reduction of costs for the permanent magnets.

DESCRIPTION OF EMBODIMENTS

An exemplary embodiment will be specifically described hereinafter with reference to the drawings.

Figure 1:
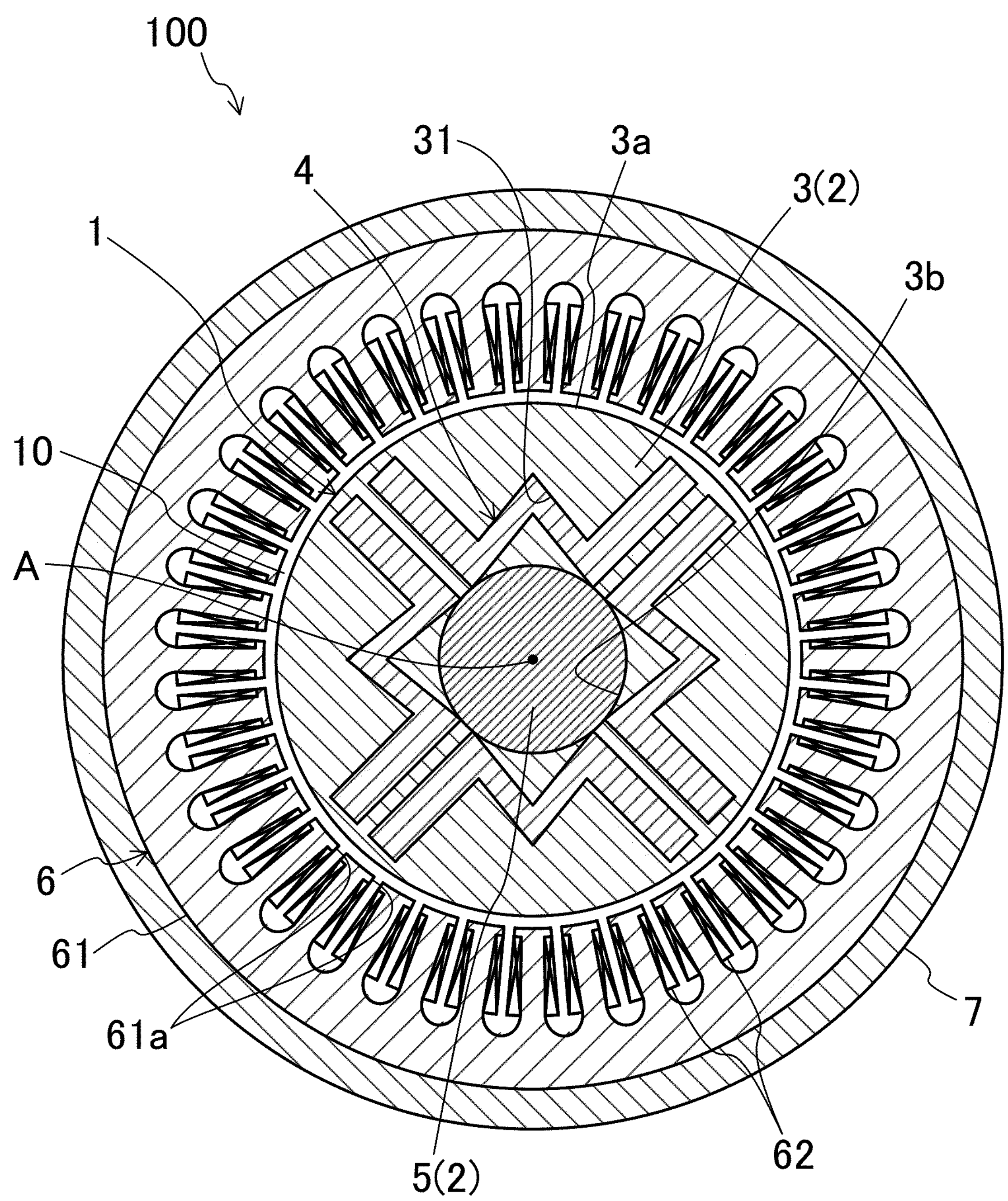
FIG. 1 is a cross-sectional view of a motor.

FIG. 1 is a cross-sectional view of a motor 100. The motor 100 includes a rotor 1 that rotates about a predetermined rotation axis A, and a stator 6 that rotates the rotor 1 about the rotation axis A. Permanent magnets 4 are embedded in the rotor 1. That is, the motor 100 is an interior permanent magnet (IPM) motor. The motor 100 may further include a motor case 7. The motor case 7 houses the rotor 1 and the stator 6. The stator 6 is fixed to the motor case 7. The rotor 1 is rotatably supported by the motor case 7.

A direction in which the rotation axis A extends will be hereinafter referred to as a “rotation axis direction.” A circumferential direction centered on the rotation axis A will be referred to as a “circumferential direction.” A radial direction centered on the rotation axis A will be referred to as a "radial direction." A side closer to the rotation axis A in the radial direction will be referred to as a "radially inner side" and the side opposite to the rotation axis A will be referred to as a "radially outer side."

The stator 6 includes a stator core 61 and a winding 62. The stator core 61 is a soft magnetic material. The stator core 61 is made of, for example, stacked electromagnetic steel sheets.

The stator core 61 has a cylindrical shape. The stator core 61 is fixed to the motor case 7. The stator core 61 includes teeth 61*a* projecting toward the inside of the stator core 61. The teeth 61*a* are arranged at intervals in the circumferential direction of the stator core 61. The winding 62 is wound around the teeth 61*a*. When a current is supplied to the winding 62, the stator 6 generates a rotating magnetic field that rotates the rotor 1.

The rotor 1 includes a rotor body 2 that rotates about the rotation axis A, and the permanent magnets 4 arranged in the rotor body 2.

The rotor body 2 is at least partially made of a soft magnetic material. The rotor body 2 has magnetic saliency, and generates a reluctance torque in a rotating magnetic field generated by the stator 6. The rotor body 2 rotates about the rotation axis A. The rotor body 2 includes a rotor core 3 having the rotation axis A, and a shaft 5.

The rotor core 3 is a soft magnetic material. The rotor core 3 is made of, for example, stacked electromagnetic steel sheets. The rotor core 3 has a cylindrical shape concentric with the stator core 61. An outer peripheral surface 3*a* of the rotor core 3 defines an outer peripheral surface of the rotor body 2. A cross-sectional shape orthogonal to rotation axis A of the rotor core 3 is uniform over the entire length of the rotor core 3 in the rotation axis direction. An air gap 10 is present between the outer peripheral surface 3*a* of the rotor core 3 and an inner peripheral surface of the stator core 61.

The shaft 5 is inserted in the rotor core 3 concentrically with the rotation axis A. The shaft 5 is fixed to the rotor core 3. The shaft 5 is rotatably supported by the motor case 7 through a bearing or other members. The rotor core 3 rotates about the rotation axis A together with the shaft 5. The shaft 5 is a magnetic material, more specifically, a soft magnetic material.

The permanent magnets 4 are arranged in the circumferential direction in the rotor core 3, and alternately have different magnetic poles in the circumferential direction. The permanent magnets 4 generate a magnet torque in a rotating magnetic field generated by the stator 6. In this example, the rotor 1 includes four permanent magnets 4. The permanent magnets 4 are arranged at regular intervals in the circumferential direction. The permanent magnets 4 are embedded in the rotor core 3. In this example, the permanent magnets 4 are embedded in a portion of the rotor core 3 located at the radially inner side of the outer peripheral surface 3*a*.

The rotor core 3 includes a plurality of (four in this example) arrangement holes 31 in which the permanent magnets 4 are respectively embedded. Each of the arrangement holes 31 is a single through hole penetrating the rotor core 3 in the rotation axis direction. A cross-sectional shape of the arrangement holes 31 orthogonal to the rotation axis A is the same as a cross-sectional shape of the permanent magnets 4 orthogonal to the rotation axis A. That is, in the arrangement holes 31, the permanent magnets 4 are embedded substantially without a gap.

The permanent magnets 4 are bonded magnets. Each of the bonded magnets is a permanent magnet made of a mixture of magnet powder and a binder for combining the magnet powder (hereinafter also referred to as a "magnet material"). Examples of the magnet powder include powders of magnets such as a neodymium magnet, a samarium iron nitrogen-based magnet, a samarium cobalt-based magnet, a ferrite magnet, and an alnico magnet, and a mixture of two or more of these powders. Examples of the binder include thermosetting resins such as an epoxy resin, thermoplastic resins such as a polyamide resin, and rubber. The bonded magnet can be shaped in a manner similar to a resin, and has higher dimensional accuracy and flexibility in shape than a sintered magnet.

Figure 2:
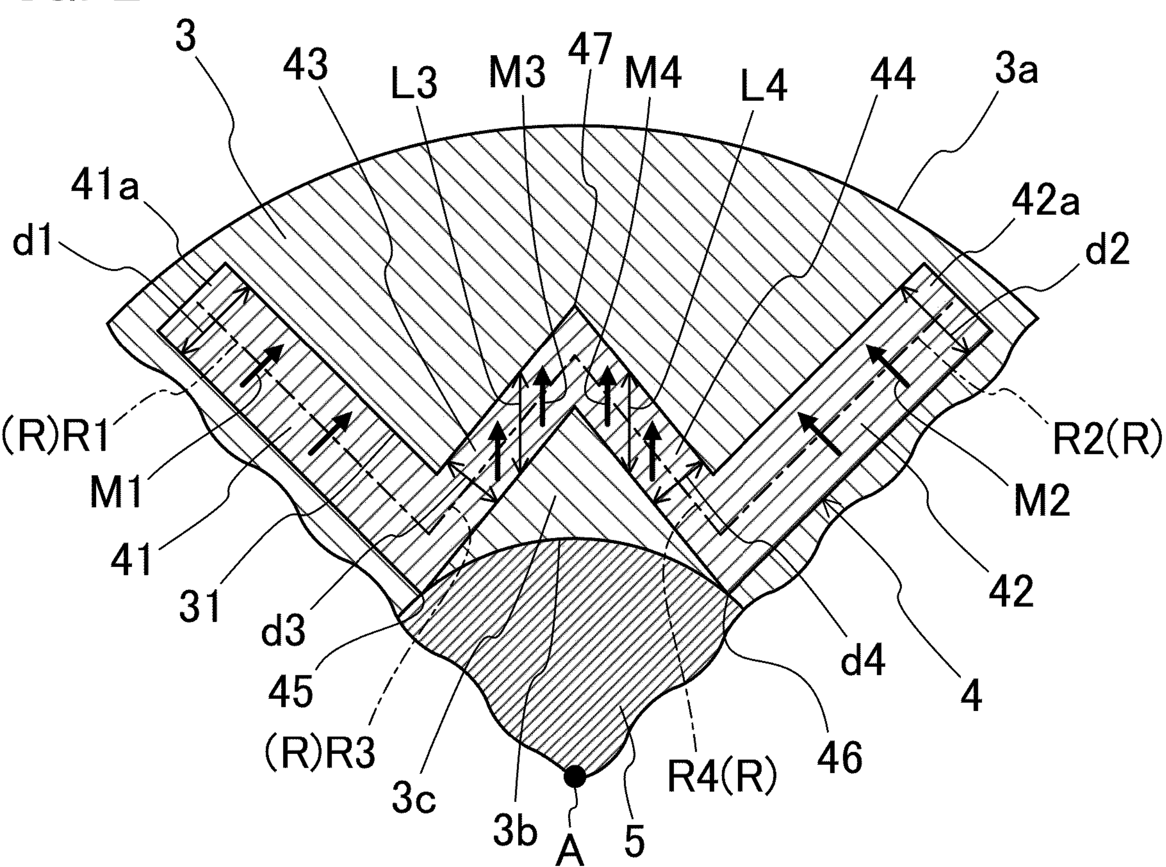
FIG. 2 is an enlarged cross-sectional view of a rotor.

FIG. 2 is an enlarged cross-sectional view of the rotor 1. Each of the permanent magnets 4 has a plate shape extending in the rotation axis direction. More specifically, each permanent magnet 4 extends over the entire length of the rotor core 3 in the rotation axis direction The "cross-sectional shape" hereinafter refers to a cross-sectional shape orthogonal the rotation axis A, unless otherwise specified. The cross-sectional shape of each permanent magnet 4 is uniform over the entire length of the permanent magnet 4 in the rotation axis direction.

Each of the permanent magnets 4 includes four linear portions 41, 42, 43, and 44. Each of the four linear portions 41, 42, 43, and 44 is a member linearly extending along a predetermined reference line in a cross section orthogonal to the rotation axis A. More specifically, each of the four linear portions 41, 42, 43, and 44 extends linearly. Hereinafter, in the case of distinguishing the four linear portions 41, 42, 43, and 44, the four linear portions 41, 42, 43, and 44 will be referred to as a first linear portion 41, a second linear portion 42, a third linear portion 43, and a fourth linear portion 44, respectively.

The first linear portion 41 and the second linear portion 42 are arranged in the circumferential direction. The first linear portion 41 and the second linear portion 42 respectively extend along a first reference line R1 and a second reference line R2 that are straight lines. Specifically, the first linear portion 41 and the second linear portion 42 extend from an outer periphery side of the rotor core 3 toward the rotation axis A. That is, each of the first linear portion 41 and the second linear portion 42 extends from the side of the outer peripheral surface 3*a* of the rotor core 3 toward an inner peripheral surface 3*b*.

The third linear portion 43 is located between the first linear portion 41 and the second linear portion 42 in the circumferential direction. The third linear portion 43 extends along a third reference line R3 that is a straight line. Specifically, the third linear portion 43 extends obliquely with respect to the radial direction and separately from the rotation axis A from an end of the first linear portion 41 closer to the rotation axis A. The end of the first linear portion 41 closer to the rotation axis A is a radially inner one of the ends of the first linear portion 41 in the first reference line R1.

The fourth linear portion 44 is located between the second linear portion 42 and the third linear portion 43 in the circumferential direction. The fourth linear portion 44 extends along a fourth reference line R4 that is a straight line. Specifically, the fourth linear portion 44 extends obliquely with respect to the radial direction and separately from the rotation axis A from an end of the second linear portion 42 closer to the rotation axis A. The end of the second linear portion 42 closer to the rotation axis A is a radially inner one of the ends of the second linear portion 42 in the second reference line R2.

More specifically, the third linear portion 43 is connected to the end of the first linear portion 41 closer to the rotation axis A. That is, the third linear portion 43 extends from the end of the first linear portion 41 closer to the rotation axis A to be separated from the rotation axis A. The fourth linear portion 44 is connected to an end of the third linear portion 43 and connected to the end of the second linear portion 42 closer to the rotation axis A. That is, the fourth linear portion 44 extends from the end of the second linear portion 42 and the rotation axis A to be separated from the rotation axis A.

The first linear portion 41 and the third linear portion 43 are connected to each other to define a V shape that is open at the radially outer side. The third linear portion 43 and the fourth linear portion 44 are connected to each other to define a V shape that is open at the radially inner side. The second linear portion 42 and the fourth linear portion 44 are connected to each other to from a V shape that is open at the radially outer side.

The cross-sectional shape of the thus-configured permanent magnets 4 are linear, more specifically a W shape. That is, the overall cross-sectional shape of the permanent magnets 4 is a shape extending along one reference line R. The reference line R is made of four continuous reference lines: the first reference line R1, the second reference line R2, the third reference line R3, and the fourth reference line R4. That is, in the permanent magnets 4, the four linear portions 41, 42, 43, and 44 are sequentially connected.

An end 41*a* of the first linear portion 41 closer to the outer peripheral surface 3*a* and an end 42*a* of the second linear portion 42 closer to the outer peripheral surface 3*a* correspond to both ends of the permanent magnets 4 in the direction of the reference line R. The two ends 41*a* and 42*a* are located at the outermost sides in the radial direction in the entire permanent magnets 4. The third linear portion 43 and the fourth linear portion 44 are located at the radially inner side of the two ends 41*a* and 42*a*. That is, as well as a connection portion 45 between the third linear portion 43 and the first linear portion 41 and a connection portion 46 between the fourth linear portion 44 and the second linear portion 42, a connection portion 47 between the third linear portion 43 and the fourth linear portion 44 is also located at the radially inner side of the two ends 41*a* and 42*a*.

In the manner described above, since the four linear portions 41, 42, 43, and 44 are located as described above, more specifically, the cross-sectional shape of the permanent magnets 4 is a W shape, the surface area, consequently the volume, of the permanent magnets 4 increases. With the increase in the surface area of the permanent magnets 4, a magnet torque, consequently a torque of the motor 100, increases. That is, motor characteristics are enhanced.

In the permanent magnets 4, the four linear portions 41, 42, 43, and 44 have different thicknesses. The thickness of at least one of the third linear portion 43 or the fourth linear portion 44 is smaller than the thickness of each of the first linear portion 41 and the second linear portion 42.

Specifically, in the permanent magnets 4 of this embodiment, a thickness d3 of the third linear portion 43 and a thickness d4 of the fourth linear portion 44 are smaller than a thickness d1 of the first linear portion 41 and a thickness d2 of the second linear portion 42. The thickness d1 of the first linear portion 41 is equal to the thickness d2 of the second linear portion 42, and the thickness d3 of the third linear portion 43 is equal to the thickness d4 of the fourth linear portion 44. Here, the thicknesses of the linear portions 41, 42, 43, and 44 are the lengths in the directions orthogonal to the reference lines R1, R2, R3, and R4, respectively, in a cross section orthogonal to the rotation axis A.

In the permanent magnets 4, magnetization directions are set as illustrated in FIG. 2. In the permanent magnets 4, the magnetization direction of the first linear portion 41 and the second linear portion 42 is different from the magnetization direction of the third linear portion 43 and the fourth linear portion 44. The magnetization direction is also called a magnetizing direction.

Specifically, a magnetization direction M1 in the first linear portion 41 is set in the thickness directions of the first linear portion 41, and a magnetization direction M2 in the second linear portion 42 is set in the thickness direction of the second linear portion 42. More specifically, the magnetization direction M1 is set in a direction orthogonal to the first reference line R1, and the magnetization direction M2 is set in a direction orthogonal to the second reference line R2. In this example, the magnetization direction M1 and the magnetization direction M2 are oriented in the direction from the outside toward the inside of the permanent magnets 4.

A magnetization direction M3 in the third linear portion 43 and a magnetization direction M4 in the fourth linear portion 44 are set in the radial direction. More specifically, the magnetization direction M3 is set in a direction obliquely to the third reference line R3, and the magnetization direction M4 in a direction obliquely to the fourth reference line R4. In this example, the magnetization direction M3 and the magnetization direction M4 are oriented in the directions toward the radially outer side.

In the manner described above, the thicknesses d3 and d4 of the third linear portion 43 and the fourth linear portion 44 are set smaller than the thicknesses d1 and d2 of the first linear portion 41 and the second linear portion 42 so that motor characteristics can be enhanced with reduction of costs for the permanent magnets 4.

Specifically, since the thickness of any of the four linear portions 41, 42, 43, and 44 is made small, as compared to a case where the four linear portions 41, 42, 43, and 44 have the same thickness, for example, the total weight of the permanent magnets 4 decreases, and thus, material costs for the permanent magnets 4 are reduced.

In general, as the thickness of the permanent magnet in the magnetization direction decreases, a permeance coefficient decreases, and demagnetization easily occurs. Occurrence of demagnetization degrades motor characteristics. In this regard, in the permanent magnets 4 of this type, since the thicknesses d3 and d4 of the third linear portion 43 and the fourth linear portion 44 are small among the four linear portions 41, 42, 43, and 44, demagnetization is suppressed, and motor characteristics can be enhanced. To easily distinguish the thickness in the magnetization direction from the thickness described above, the thickness in the magnetization direction will be hereinafter referred to as a "length in the magnetization direction."

In the first linear portion 41 and the second linear portion 42, the lengths of the magnetization directions M1 and M2 are equal to the directions of the thicknesses d1 and d2, and thus, the lengths in the magnetization directions M1 and M2 are equal to the thicknesses d1 and d2. On the other hand, in the third linear portion 43, since the magnetization direction M3 is set in the radial direction, a length L3 in the magnetization direction M3 is larger than the thickness d3. In the fourth linear portion 44, since the magnetization direction M4 is set in the radial direction, a length L4 in the magnetization direction M4 is larger than the thickness d4.

That is, if the thicknesses of the first linear portion 41 and the second linear portion 42 are equal to the thicknesses of the third linear portion 43 and the fourth linear portion 44, the length in the magnetization direction is larger in the third linear portion 43 and the fourth linear portion 44 than in the first linear portion 41 and the second linear portion 42. Thus, demagnetization can be more greatly suppressed in the case of reducing the thicknesses of the third linear portion 43 and the fourth linear portion 44 than in the case of reducing the thicknesses of the first linear portion 41 and the second linear portion 42. Accordingly, motor characteristics can be enhanced. In this manner, motor characteristics can be enhanced with reduction of costs for the permanent magnets 4.

Since the magnetization direction M1 of the first linear portion 41 is set in the thickness direction of the first linear portion 41, the magnetization direction M2 of the second linear portion 42 is set in the thickness direction of the second linear portion 42, and the magnetization directions M3 and M4 of the third linear portion 43 and the fourth linear portion 44 are set in the radial direction, effectiveness of reducing the thicknesses d3 and d4 of the third linear portion 43 and the fourth linear portion 44 increases.

In the permanent magnets 4 of this example, the connection portion 45 between the first linear portion 41 and the third linear portion 43 and the connection portion 46 between the second linear portion 42 and the fourth linear portion 44 coincide with the inner peripheral surface 3*b* of the rotor core 3. In other words, each of the two connection portions 45 and 46 is exposed from the inner peripheral surface 3*b* of the rotor core 3. That is, the two connection portions 45 and 46 are closest to the rotation axis A in the permanent magnets 4. Furthermore, in the rotor core 3, a portion 3*c* defined by the third permanent magnets 43, the fourth permanent magnets 44, and the outer peripheral surface of the shaft 5 is partitioned from the other portion.

In the manner described above, since the two connection portions 45 and 46 coincide with the inner peripheral surface 3*b* of the rotor core 3, the rotor core 3 is not interposed between the connection portions 45 and 46 and the inner peripheral surface 3*b* of the rotor core 3. In other words, the rotor core 3 is not present between the connection portions 45 and 46 and the shaft 5. With this configuration, a so-called q-axis inductance decreases in the rotor 1. The decrease in the q-axis inductance increases a power factor.

Figure 3:
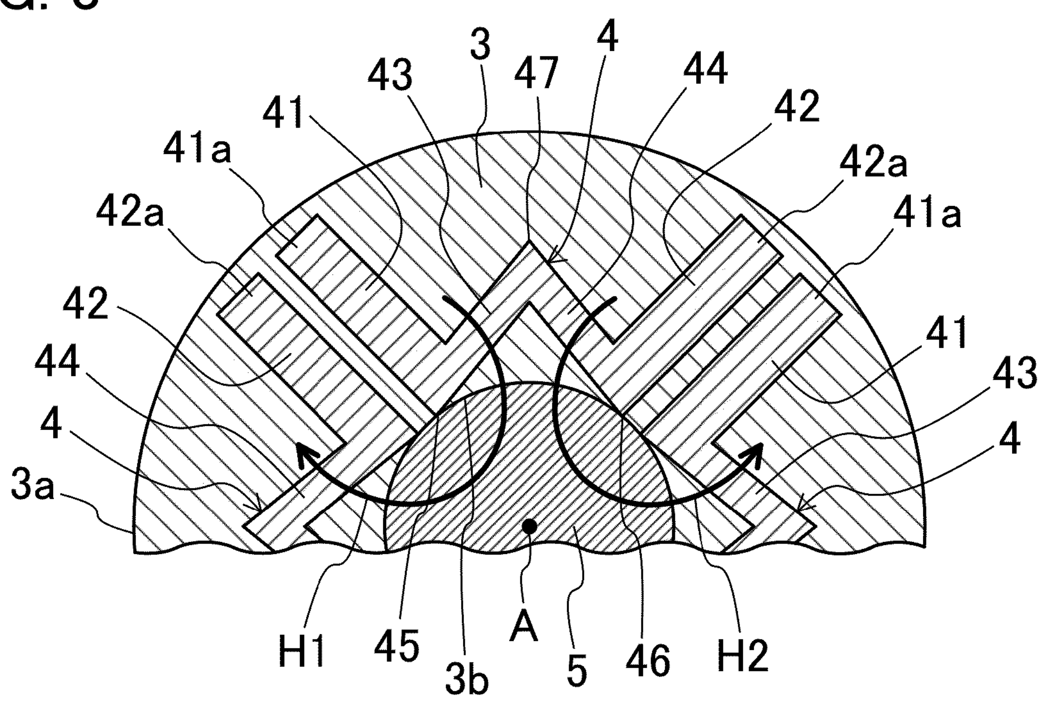
FIG. 3 is a cross-sectional view illustrating magnetic flux flows of permanent magnets in the rotor.

Furthermore, as illustrated in FIG. 3, the magnetic flux density by the permanent magnets 4 increases. FIG. 3 is a cross-sectional view illustrating magnetic flux flows of the permanent magnets 4 in the rotor 1. In the rotor 1, as described, above, the connection portions 45 and 46 of the permanent magnets 4 coincide with the inner peripheral surface 3*b* of the rotor core 3, and in addition, the shaft 5 is a magnetic material. Thus, in the permanent magnets 4, a magnetic flux H1 from the third linear portion 43 reliably flows into the fourth linear portion 44 of another permanent magnet 4 through the shaft 5. In the permanent magnets 4, a magnetic flux H2 of the fourth linear portion 44 reliably flows into the third linear portion 43 of another permanent magnet 4 through the shaft 5.

That is, if the rotor core 3 is present between the connection portions 45 and 46 and the shaft 5, the magnetic fluxes H1 and H2 from the third linear portion 43 and the fourth linear portion 44 might leak from between the connection portions 45 and 46 and the shaft 5, but this leakage is prevented in this example. In addition, since the shaft 5 is a magnetic material, as compared to a case where the shaft 5 is not a magnetic material, the magnetic fluxes H1 and H2 from the third linear portion 43 and the fourth linear portion 44 easily pass through the shaft 5 to flow into the third linear portion 43 and the fourth linear portion 44 of another permanent magnet 4. Accordingly, the magnetic flux density of the permanent magnets 4 increases. Consequently, the magnet torque increases.

Figures 4, 5:
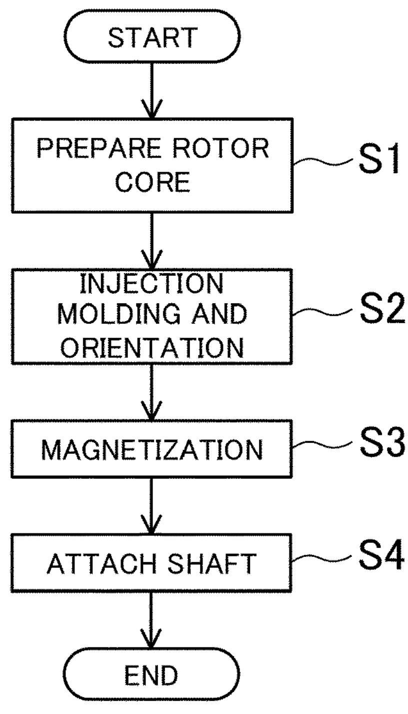
FIG. 4 is a flowchart depicting a rotor manufacturing method.
FIG. 5 is a cross-sectional view illustrating a state of orientation of permanent magnets.

A method for manufacturing the rotor 1 described above will be described. FIG. 4 is a flowchart depicting a method for manufacturing the rotor 1. FIG. 5 is a cross-sectional view illustrating a state of orientation of the permanent magnets 4. In this example, the permanent magnets 4 are anisotropic bonded magnets. In the following description, the permanent magnets 4 are bonded magnets.

First, in step S1, a rotor core 3 having arrangement holes 31 in which bonded magnets are placed is prepared.

In subsequent step S2, bonded magnets in a non-magnetized state are molded by injection. That is, bonded magnets in a non-magnetized state are placed in the arrangement holes 31. Further, in step S2, in the injection molding of the bonded magnets, orientation of the bonded magnets is also performed. Specifically, in step S2, a material for bonded magnets (i.e., magnet material) is injected into each of the arrangement holes 31 of the rotor core 3, thereby injection molding bonded magnets in a non-magnetized state. In addition, in the injection molding of the bonded magnets in a non-magnetized state, orientation magnetic flux generators individually corresponding to the arrangement holes 31 are located at the outer side and the inner side of the rotor core 3, and the bonded magnets in a non-magnetized state are oriented. In this example, as the orientation magnetic flux generators, "outer magnets 91, 92, 93, and 94" and "inner magnets 96, 97, 98, and 99" are arranged.

Specifically, the rotor core 3 prepared in step S1 is placed in an unillustrated predetermined die. The die includes a sprue and a runner that are channels for a magnet material. The magnet material is injected into each of the arrangement holes 31 through the sprue and other portions, thereby molding bonded magnets in a non-magnetized state by injection.

As illustrated in FIG. 5, four outer magnets 91, 92, 93, and 94 are arranged in the same number as the number of the arrangement holes 31 at the outer side of the rotor core 3 placed in the die, and four inner magnets 96, 97, 98, and 99 are arranged in the same number as the number of the arrangement holes 31 at the inner side of the rotor core 3. The four outer magnets 91, 92, 93, and 94 are respectively located in association with the four arrangement holes 31. The four inner magnets 96, 97, 98, and 99 are also respectively located in association with the four arrangement holes 31. That is, the outer magnets 91, 92, 93, and 94 and the inner magnets 96, 97, 98, and 99 face each other with the corresponding arrangement holes 31 interposed therebetween. In this manner, the outer magnets 91, 92, 93, and 94 and the inner magnets 96, 97, 98, and 99 are arranged so that the bonded magnets in a non-magnetized state are thereby oriented.

Specifically, an orientation state of the bonded magnets will be described with reference to FIG. 5. In this embodiment, an orientation state of one of the four bonded magnets, that is, an upper bonded magnet in FIG. 5, will be described as a representative. Thus, FIG. 5 shows an orientation state of the upper bonded magnet, and does not show orientation states of the other three bonded magnets.

With the two outer magnets 91 and 94, the first linear portion 41 of the bonded magnet and the second linear portion 42 of its adjacent bonded magnet are oriented. That is, a magnetic flux H3 from the outer magnet 94 passes through the second linear portion 42 and the first linear portion 41 in this order to flow into the outer magnet 91. With the two outer magnets 91 and 92, the second linear portion 42 of the bonded magnet and the first linear portion 41 of its adjacent bonded magnet are oriented. That is, a magnetic flux H4 from the outer magnet 92 passes through the first linear portion 41 and the second linear portion 42 in this order to flow into the outer magnet 91.

With the outer magnet 91 and the inner magnet 96, the third linear portion 43 and the fourth linear portion 44 of the bonded magnet are oriented. Specifically, a magnetic flux H5 from the inner magnet 96 passes through the third linear portion 43 to flow into the outer magnet 91. Another magnetic flux H6 from the inner magnet 96 passes through the fourth linear portion 44 to flow into the outer magnet 91. In this manner, the inner magnets 96, 97, 98, and 99 are located in order to orient the third linear portion 43 and the fourth linear portion 44 that are difficult to be oriented only by the outer magnets 91, 92, 93, and 94. Here, since the connection portion 45 coincides the inner peripheral surface 3*b* of the rotor core 3, that is, the rotor core 3 is not present between the connection portion 45 and the inner peripheral surface 3*b*, the magnetic flux H5 from the inner magnet 96 reliably passes through the third linear portion 43 without a short circuit. In addition, since the connection portion 46 coincides with the inner peripheral surface 3*b* of the rotor core 3, that is, the rotor core 3 is not present between the connection portion 46 and the inner peripheral surface 3*b*, the magnetic flux H6 from the inner magnet 96 reliably passes through the fourth linear portion 44 without a short circuit. Thus, the third linear portion 43 and the fourth linear portion 44 are appropriately oriented. Accordingly, the orientation rate of the entire bonded magnets is enhanced.

In next step S3, magnetization is performed by a magnetizer. Specifically, after the bonded magnets in a non-magnetized state is molded by injection and oriented in step S2, magnetization magnetic flux generators corresponding to the respective arrangement holes 31 are placed at the outer side and the inner side of the rotor core 3, and the bonded magnets in a non-magnetized state are magnetized. That is, the bonded magnets in a non-magnetized state placed in the arrangement holes 31 are magnetized.

In these magnetizers, in a manner similar to the orientation in step S2, the outer magnets 91, 92, 93, and 94 and the inner magnets 96, 97, 98, and 99 as illustrated in FIG. 5 are placed as magnetization magnetic flux generators. Then, in a manner similar to the orientation, the magnetic fluxes H3 through H6 flow so that the first linear portion 41, the second linear portion 42, the third linear portion 43, and the fourth linear portion 44 are thereby magnetized in the bonded magnet. In this magnetization, the magnetic fluxes H5 and H6 from the inner magnet 96 also pass through the third linear portion 43 and the fourth linear portion 44 without a short circuit, and thus, the third linear portion 43 and the fourth linear portion 44 are appropriately magnetized. Accordingly, the magnetization rate of the entire bonded magnets is enhanced. By performing magnetization in this manner, the magnetization directions M1, M2, M3, and M4 are set in the linear portions 41, 42, 43, and 44.

Thereafter, in step S4, the shaft 5 is attached to the rotor core 3. In this manner, fabrication of the rotor 1 is completed.

In the manner described above, the permanent magnets 4 of the rotor 1 of this example includes: the first linear portion 41 and the second linear portion 42 extending from an outer periphery side of the rotor core 3 closer to the rotation axis A; the third linear portion 43 located between the first linear portion 41 and the second linear portion 42 and extending obliquely with respect to the radial direction and separately from the rotation axis A from the end of the first linear portion 41 closer to the rotation axis A; the fourth linear portion 44 located between the second linear portion 42 and the third linear portion 43 and extending obliquely with respect to the radial direction and separately from the rotation axis A from the end of the second linear portion 42 closer to the rotation axis A. Since the four linear portions 41, 42, 43, and 44 are arranged in this manner, the cross-sectional shape of the permanent magnets 4 is a continuous or intermittent linear shape that is curved or bent in the radial direction. Thus, the surface area of the permanent magnets 4 increases to increase a magnet torque so that motor characteristics are thereby enhanced.

In each of the permanent magnets 4, the thicknesses d3 and d4 of the third linear portion 43 and the fourth linear portion 44 are smaller than the thicknesses d1 and d2 of the first linear portion 41 and the second linear portion 42. Thus, as compared to a case where the four linear portions 41, 42, 43, and 44 have the same thickness, for example, the total weight of the permanent magnets 4 decreases, and thus, material costs for the permanent magnets 4 can be reduced. On the other hand, since the first linear portion 41 and the second linear portion 42 have a different magnetization direction from that of the third linear portion 43 and the fourth linear portion 44, the lengths L3 and L4 of the third linear portion 43 and the fourth linear portion 44 in the magnetization directions M3 and M4 are larger than the length (i.e., thicknesses d1 and d2) of the first linear portion 41 and the second linear portion 42 in the magnetization directions M1 and M2. Thus, demagnetization can be more greatly suppressed by reducing the thicknesses d3 and d4 of the third linear portion 43 and the fourth linear portion 44 than by reducing the thicknesses d1 and d2 of the first linear portion 41 and the second linear portion 42. In this manner, motor characteristics can be enhanced. As a result, motor characteristics can be enhanced with reduction of costs for the permanent magnets 4.

In the permanent magnets 4 of the rotor 1, the magnetization direction M1 of the first linear portion 41 is set in the thickness direction of the first linear portion 41, the magnetization direction M2 of the second linear portion 42 is set in the thickness direction of the second linear portion 42, and the magnetization directions M3 and M4 of the third linear portion 43 and the fourth linear portion 44 are set at the radial direction. Accordingly, effectiveness of reducing the thicknesses d3 and d4 of the third linear portion 43 and the fourth linear portion 44 increases.

In addition, the third linear portion 43 is connected to the end of the first linear portion 41 closer to the rotation axis A, and the fourth linear portion 44 is connected to the end of the third linear portion 43 and connected to the end of the second linear portion 42 closer to the rotation axis A. The cross-sectional shape of the permanent magnets 4 is a W shape. That is, the cross-sectional shape of the permanent magnets 4 is a continuous W-shaped linear shape. Thus, as compared to an intermittent linear shape, for example, the surface area of the permanent magnets 4 can be increased.

The connection portion 45 between the first linear portion 41 and the third linear portion 43 and the connection portion 46 between the second linear portion 42 and the fourth linear portion 44 coincide with the inner peripheral surface 3*b* of the rotor core 3. Thus, the rotor core 3 is not present between the connection portions 45 and 46 and the shaft 5, and thus, a so-called q-axis inductance decreases, and a power factor increases. Since the connection portions 45 and 46 coincide with the inner peripheral surface 3*b*, the arrangement area of the permanent magnets 4 is large in the radial direction of the rotor core 3, and the surface area of the permanent magnets 4 can be further increased. Accordingly, a torque of the motor 100 increases, and motor characteristics are enhanced.

The rotor 1 further includes the shaft 5 of a magnetic material inserted in the rotor core 3 coaxially with the rotation axis A. Thus, as compared to a case where the shaft is not a magnetic material, the magnetic fluxes H1 and H2 generated from the third linear portion 43 and the fourth linear portion 44 easily pass through the shaft 5 to flow into the third linear portion 43 and the fourth linear portion 44 of another permanent magnet 4. Accordingly, the magnetic flux density of the permanent magnets 4 increases. Accordingly, a magnet torque increases, and motor characteristics are enhanced.

The permanent magnets 4 are bonded magnets. Thus, each of the permanent magnets 4 can be easily shaped in a desired shape.

Other Embodiments

In the foregoing section, the embodiment has been described as an example of the technique disclosed in the present application. The technique disclosed here, however, is not limited to this embodiment, and is applicable to other embodiments obtained by changes, replacements, additions, and/or omissions as necessary. Components described in the above embodiment may be combined as a new exemplary embodiment. Components provided in the accompanying drawings and the detailed description can include components unnecessary for solving problems as well as components necessary for solving problems in order to exemplify the technique. Therefore, it should not be concluded that such unnecessary components are necessary only because these unnecessary components are included in the accompanying drawings or the detailed description.

Figure 6:
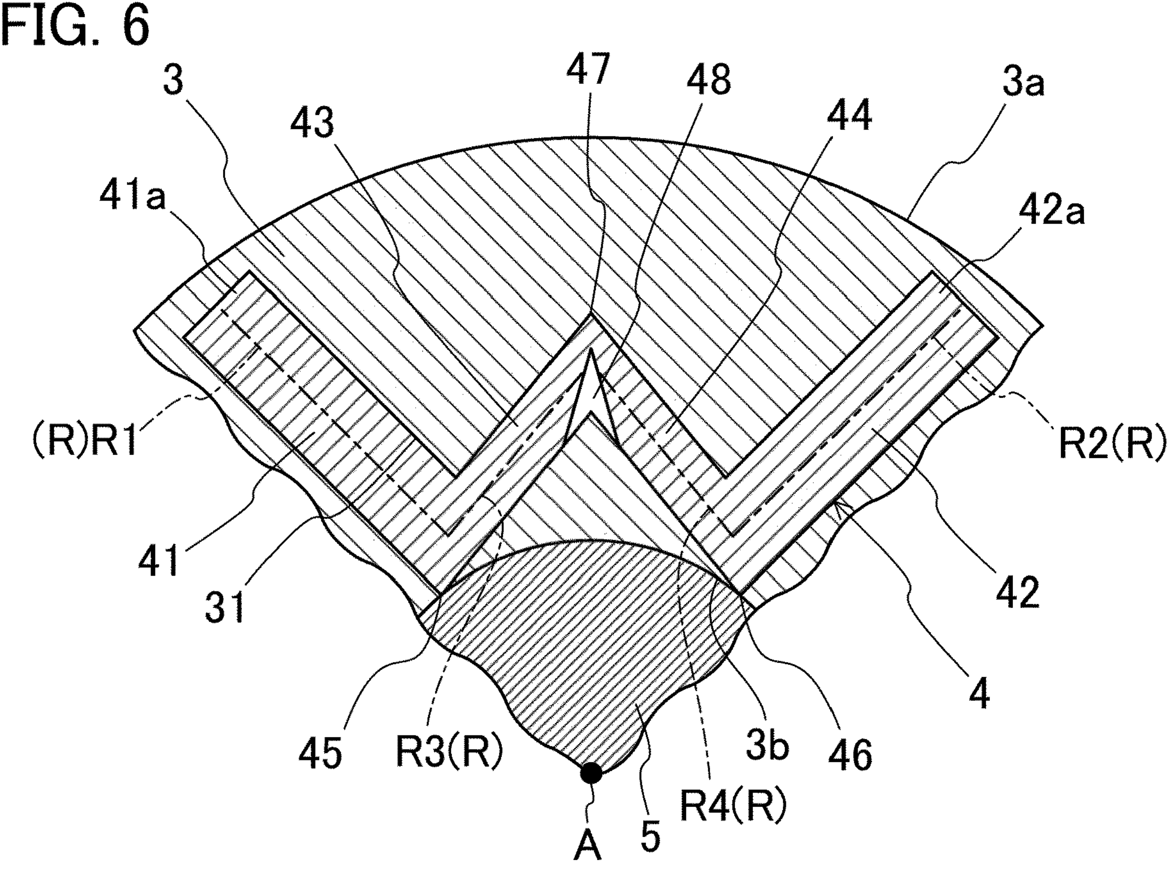
FIG. 6 is an enlarged cross-sectional view of a rotor according to another embodiment.

For example, as illustrated in FIG. 6, the rotor core 3 according to the embodiment may include a gap 48. FIG. 6 is an enlarged cross-sectional view of a rotor 1 according to another embodiment.

The rotor core 3 of this example includes the gap 48 obtained by removing a portion of the connection portion 47 between the third linear portion 43 and the fourth linear portion 44 closer to the rotation axis A in the radial direction. That is, by removing a radially inner portion of the connection portion 47 of the permanent magnets 4, the gap 48 is obtained in the arrangement hole 31. This gap 48 suppresses demagnetization, more specifically, local demagnetization.

Figure 7:
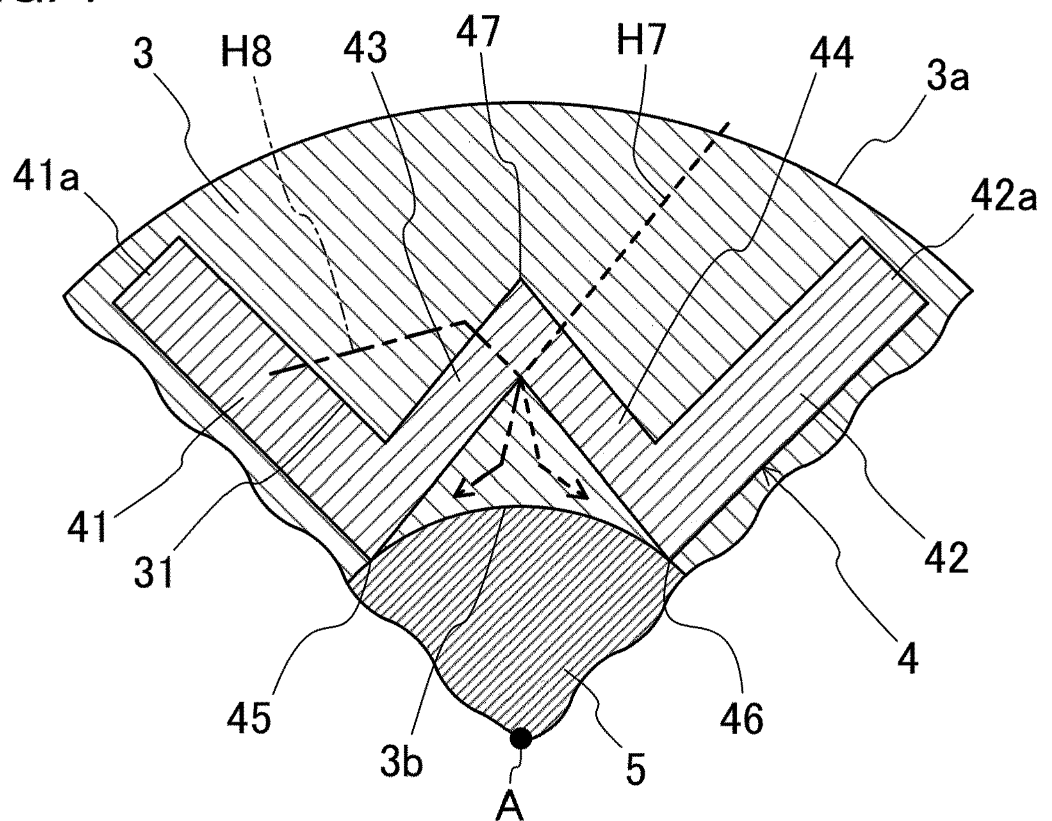
FIG. 7 is an enlarged cross-sectional view of the rotor for describing local demagnetization.

FIG. 7 is an enlarged cross-sectional view of a rotor 1 for describing local demagnetization. In the permanent magnets 4, local demagnetization easily occurs in a radially inner portion of the connection portion 47. This is because a magnetic flux H7 from the stator 6 and a magnetic flux H8 from the first linear portion 41 and the second linear portion 42 are easily concentrated in the radially inner portion of the connection portion 47, as illustrated in FIG. 7. The magnetic fluxes H7 and H8 flow in directions that cancels magnetic forces. In this example, since a portion susceptible to local demagnetization is made as the gap 48, local demagnetization can be suppressed.

Figure 8:
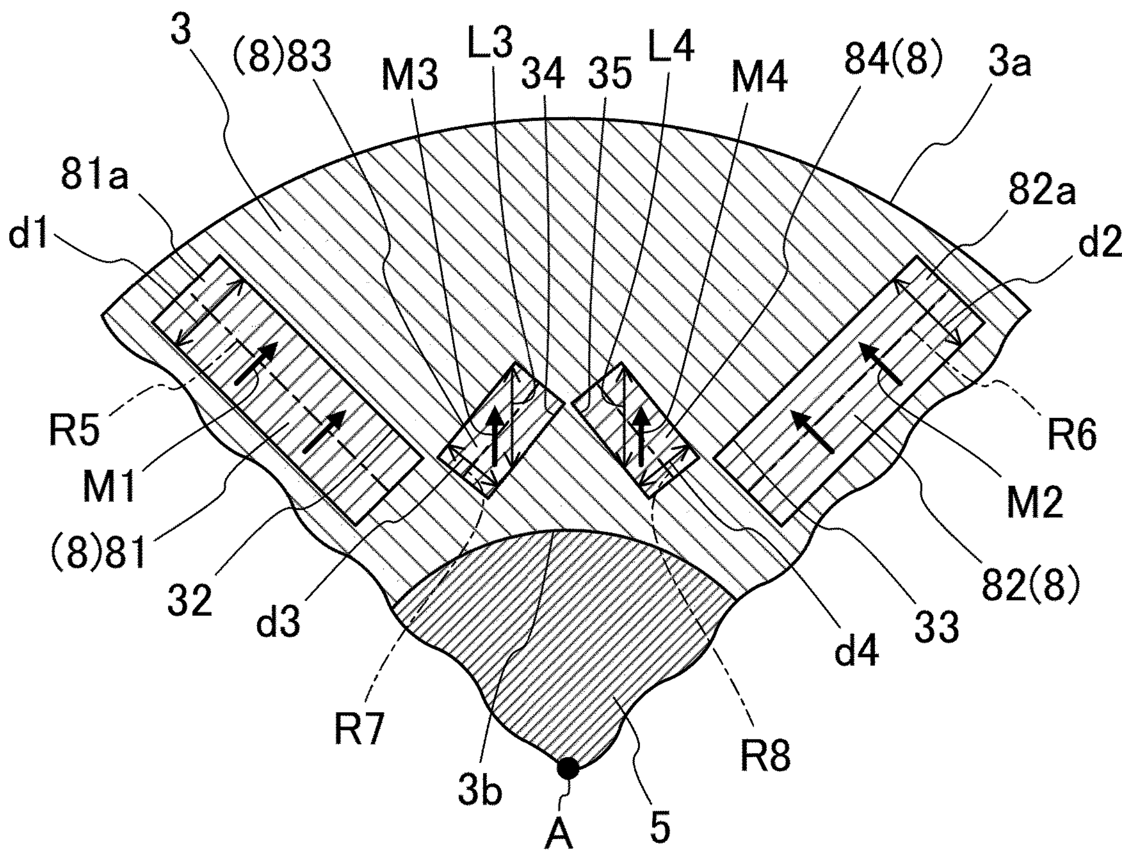
FIG. 8 is an enlarged cross-sectional view of a rotor according to another embodiment.

As illustrated in FIG. 8, the cross-sectional shape of the permanent magnets may be changed. FIG. 8 is an enlarged cross-sectional view of the rotor 1 according to another embodiment.

In a permanent magnet 8 of this example, the four linear portions of the permanent magnets 4 of the embodiment described above are separated from each other. Specifically, the permanent magnet 8 includes four linear portions, that is, a first linear portion 81, a second linear portion 82, a third linear portion 83, and a fourth linear portion 84. In a manner similar to the embodiment described above, each of the four linear portions 81, 82, 83, and 84 extends in a straight line along a predetermined reference line in a cross section orthogonal the rotation axis A. That is, the first linear portion 81, the second linear portion 82, the third linear portion 83, and the fourth linear portion 84 respectively extend along a first reference line R5, a second reference line R6, a third reference line R7, and a fourth reference line R8 that are straight lines. The first linear portion 81, the second linear portion 82, the third linear portion 83, and the fourth linear portion 84 are separated from each other. In this manner, the cross-sectional shape of the permanent magnet 8 has an intermittent W-shaped linear shape. The rotor core 3 includes four arrangement holes 32, 33, 34, and 35 in which the four linear portions 81, 82, 83, and 84 are respectively embedded.

An end 81*a* of the first linear portion 81 closer to an outer peripheral surface 3*a* and an end 82*a* of the second linear portion 82 closer to the outer peripheral surface 3*a* are located at the outermost side in the radial direction in the entire permanent magnet 8. The third linear portion 83 and the fourth linear portion 84 are located at the radially inner side of the two ends 81*a* and 82*a*. In this manner, the four linear portions 81, 82, 83, and 84 are arranged, more specifically, the cross-sectional shape of the permanent magnet 8 is the intermittent W-shaped linear shape, so that the surface area of the permanent magnet 8 increases. Accordingly, a torque of the motor 100 increases, and motor characteristics are enhanced.

In the permanent magnet 8 of this example, a thickness d3 of the third linear portion 83 and a thickness d4 of the fourth linear portion 84 are smaller than a thickness d1 of the first linear portion 81 and a thickness d2 of the second linear portion 82. The thickness d1 of the first linear portion 81 is equal to the thickness d2 of the second linear portion 82, and the thickness d3 of the third linear portion 83 is equal to the thickness d4 of the fourth linear portion 84. The thicknesses of the linear portions 81, 82, 83, and 84 are the lengths in the direction orthogonal to reference lines R5, R6, R7, and R8 in a cross section orthogonal to the rotation axis A.

In the permanent magnet 8, the first linear portion 81, the second linear portion 82, the third linear portion 83, and the fourth linear portion 84 have different magnetization directions. As illustrated in FIG. 8, the magnetization directions in the linear portions 81, 82, 83, and 84 are similar to those in the embodiment. That is, a magnetization direction M1 of the first linear portion 81 is set in the thickness direction of the first linear portion 81, and a magnetization direction M2 of the second linear portion 82 is set in the thickness direction of the second linear portion 82. Each of the magnetization direction M3 of the third linear portion 83 and the magnetization direction M4 of the fourth linear portion 84 is set in the radial direction.

This permanent magnet 8 can also enhance motor characteristics while reducing costs for the permanent magnet 8. That is, material costs for the permanent magnet 8 can be reduced by setting the thicknesses d3 and d4 of the third linear portion 83 and the fourth linear portion 84 smaller than the thicknesses d1 and d2 of the first linear portion 81 and the second linear portion 82. On the other hand, since the magnetization direction of the first linear portion 81 and the second linear portion 82 is different from the magnetization direction of the third linear portion 83 and the fourth linear portion 84, the lengths L3 and L4 of the third linear portion 83 and the fourth linear portion 84 in the magnetization directions M3 and M4 are larger than the lengths (i.e., thicknesses d1 and d2) of the first linear portion 81 and the second linear portion 82 in the magnetization directions M1 and M2. Accordingly, demagnetization can be more greatly suppressed by reducing the thicknesses d3 and d4 of the third linear portion 83 and the fourth linear portion 84 than by reducing the thicknesses d1 and d2 of the first linear portion 81 and the second linear portion 82. In this manner, motor characteristics can be enhanced. In this manner, motor characteristics can be enhanced with reduction of costs for the permanent magnet 8. In addition, since the linear portions 81, 82, 83, and 84 are separated from each other, the shape of the linear portions is simplified. Thus, the permanent magnet 8 is easily fabricated.

Figure 9:
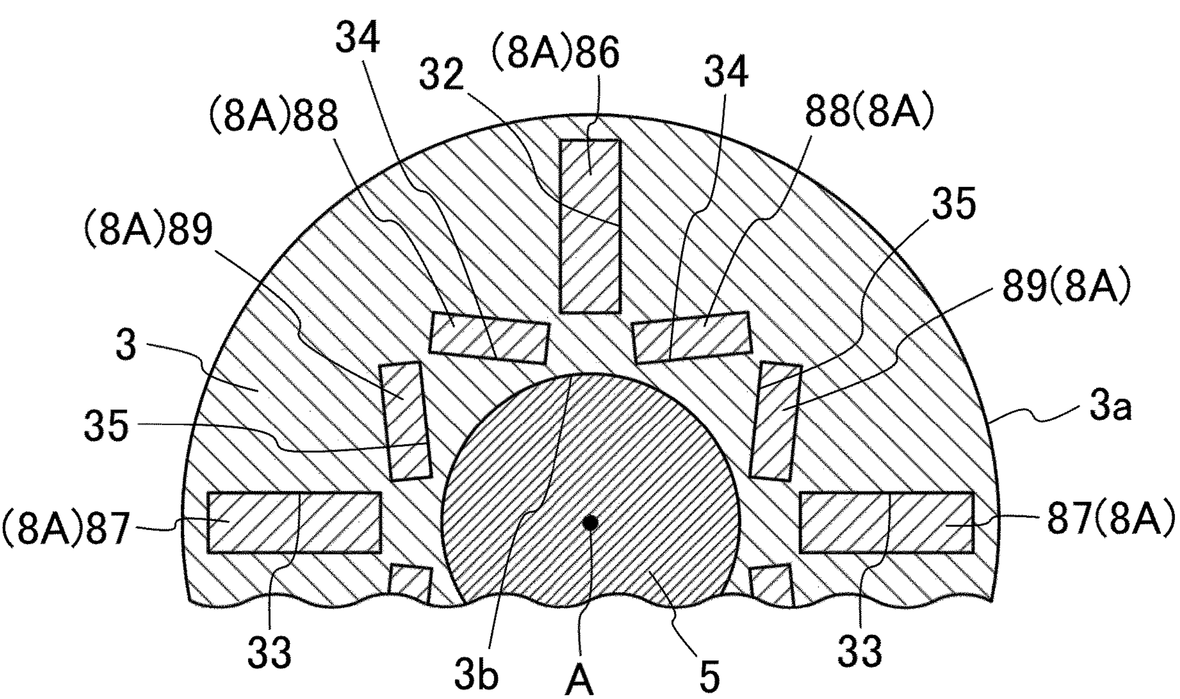
FIG. 9 is an enlarged cross-sectional view of a rotor according to another embodiment.

As illustrated in FIG. 9, a first linear portion 86 and a second linear portion 87 of a permanent magnet 8A may be shared with its adjacent permanent magnet 8A in the circumferential direction. FIG. 9 is an enlarged cross-sectional view of a rotor 1 according to another embodiment. That is, in the permanent magnet 8A, the first linear portion 86 also functions as a first linear portion 86 in the adjacent permanent magnet 8A, and the second linear portion 87 also functions as a second linear portion 87 in the adjacent permanent magnet 8A. Each of the permanent magnets 8A includes the third linear portion 88 and the fourth linear portion 89 as dedicated linear portions. In this embodiment, the number of parts of the permanent magnet 8A can be reduced.

The number of the permanent magnets 4, 8, or 8A are not limited to those described above.

In the embodiment, only one of the two connection portions 45 and 46 may coincide with an inner peripheral surface 3*b* of the rotor core 3.

Figure 10:
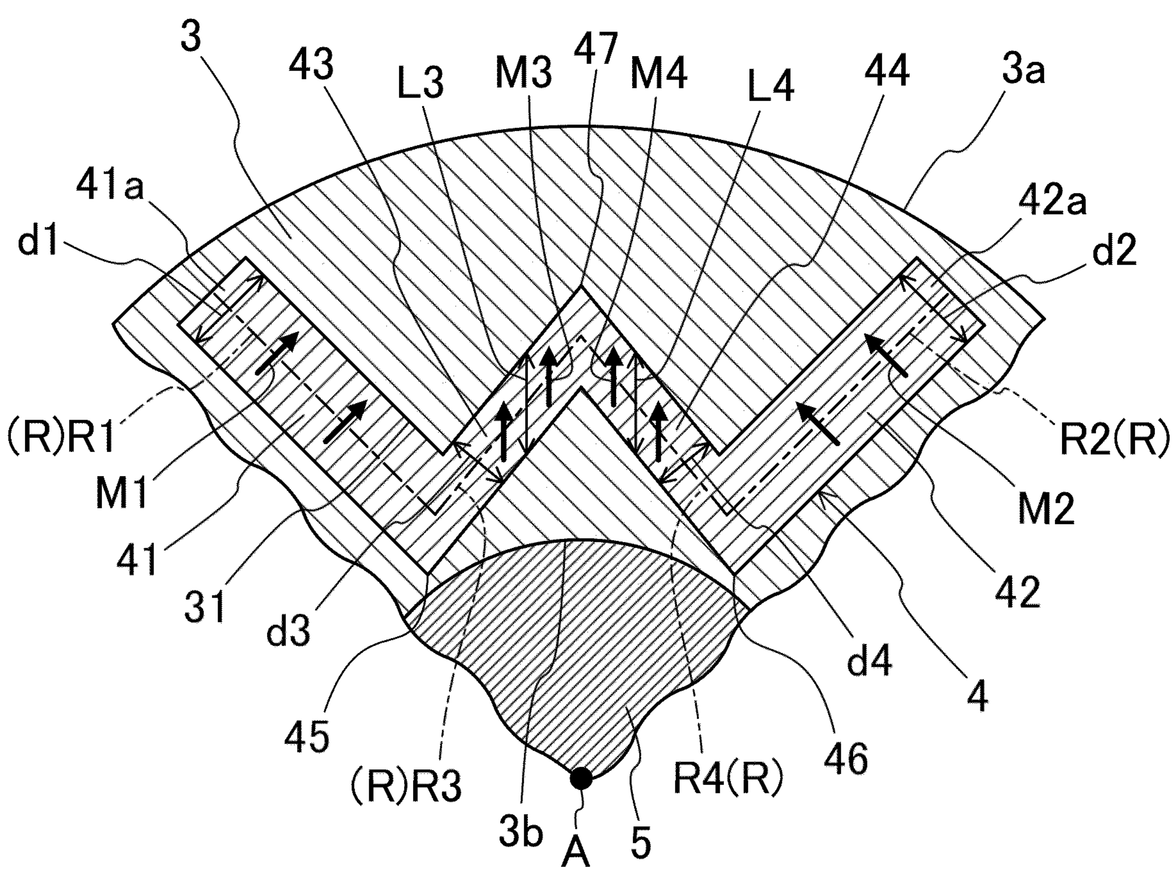
FIG. 10 is an enlarged cross-sectional view of a rotor according to another embodiment.

As illustrated in FIG. 10, the connection portions 45 and 46 in the permanent magnets 4 may not coincide with the inner peripheral surface 3*b* of the rotor core 3. That is, portions of the permanent magnet 4 closest to the rotation axis A may be located at the radially outer side of the inner peripheral surface 3*b* in the rotor core 3.

In the permanent magnets 4, 8, and 8A, the sets of the third linear portions 43, 83, and 88 and the fourth linear portions 44, 84, and 89 located between the first linear portions 41, 81, and 86 and the second linear portions 42, 82, and 87 are not limited to a single set and may be two or more sets.

The permanent magnets 4, 8, and 8A may be anisotropic bonded magnets or isotropic bonded magnets. The permanent magnets 4, 8, and 8A may be magnets other than bonded magnets and may be, for example, sintered magnets.

The shaft 5 may not be a soft magnetic material.

The shaft 5 may be integrated with the rotor core 3. For example, the portion 3*c* of the rotor core 3 may be integrated with the shaft 5. In this case, the number of parts in the rotor 1 may be reduced.

The method for manufacturing the rotor 1 disclosed here is also applicable to a case where the permanent magnets 4, 8, and 8A are magnets such as isotropic bonded magnets and sintered magnets.

For example, in a case where the permanent magnets 4, 8, and 8A are isotropic bonded magnets, in the steps described in the method for manufacturing the rotor 1 according to this embodiment, the process of step S2 is changed, and the other steps S1, S3, and S4 are performed in the same manner as in the embodiment. Specifically, in step S2 of this example, in a manner similar to the embodiment, bonded magnets in a non-magnetized state are molded by injection. That is, bonded magnets in a non-magnetized state are placed in the arrangement holes 31. However, in step S2 of this example, unlike the embodiment described above, bonded magnets are not oriented in molding bonded magnets by injection.

In a case where the permanent magnets 4, 8, and 8A are magnets other than bonded magnets, such as sintered magnets, in the steps described in the method for manufacturing the rotor 1 of the embodiment, the process of step S2 is changed, and the other steps S1, S3, S4 are performed in the same manner as in the embodiment. Specifically, in step S2, unlike the embodiment, sintered magnets in a non-magnetized state are individually inserted in the arrangement holes 31. In this manner, sintered magnets in a non-magnetized state are placed in the arrangement holes 31. In the manner described above, in step S2 of this example, none of injection molding and orientation employed in the embodiment is performed.

In the method for fabricating the rotor 1 according to the present disclosure, the orientation magnetic flux generator and the magnetization magnetic flux generator are not limited to magnets such as the outer magnets 91, 92, 93, and 94 and the inner magnets 96, 97, 98, and 99 and may use coils, for example.

In the manner described above, the rotor 1 according to a first aspect of the technique of the present disclosure includes: the rotor core 3 including the rotation axis A; and the permanent magnets 4, 8, and 8A arranged in the circumferential direction centered on the rotation axis A in the rotor core 3, and alternately having different magnetic poles in the circumferential direction. In a cross section orthogonal to the rotation axis A, the permanent magnets 4, 8, and 8A are located between the first linear portions 41, 81, and 86 and the second linear portions 42, 82, and 87 extending from an outer periphery side of the rotor core 3 closer to the rotation axis A, the third linear portions 43, 83, and 88 located between the first linear portions 41, 81, and 86 and the second linear portions 42, 82, and 87 in the circumferential direction and extending from the ends of the first linear portions 41, 81, and 86 closer to the rotation axis A obliquely with respect to the radial direction centered on the rotation axis A and separately from the rotation axis A; and the fourth linear portions 44, 84, and 89 located between the second linear portions 42, 82, and 87 and the third linear portions 43, 83, and 88 in the circumferential direction and extending obliquely with respect to the radial direction and separately from the rotation axis A from the ends of the second linear portions 42, 82, and 87 closer to the rotation axis A. At least one of the thicknesses d3 and d4 of the third linear portions 43, 83, and 88 and the fourth linear portions 44, 84, and 89 are smaller than the thicknesses d1 and d2 of the first linear portions 41, 81, and 86 and the second linear portions 42, 82, and 87.

With this configuration, the cross-sectional shapes of the permanent magnets 4, 8, and 8A are continuous or intermittent linear shapes that are curved or bent in the radial direction. Thus, the surface area of the permanent magnets 4, 8, and 8A increases to increase a magnet torque so that motor characteristics are thereby enhanced. Since the thicknesses d3 and d4 of the third linear portions 43, 83, and 88 and the fourth linear portions 44, 84, and 89 are smaller than the thicknesses d1 and d2 of the second linear portions 42, 82, and 87 of the first linear portions 41, 81, and 86, material costs for the permanent magnets 4, 8, and 8A can be reduced. On the other hand, since the magnetization direction of the first linear portions 41, 81, and 86 and the second linear portions 42, 82, and 87 is different from the magnetization direction of the third linear portions 43, 83, and 88 and the fourth linear portions 44, 84, and 89, the lengths L3 and L4 of the third linear portions 43, 83, and 88 and the fourth linear portions 44, 84, and 89 in the magnetization directions M3 and M4 are larger than the lengths (i.e., thicknesses d1 and d2) of the first linear portions 41, 81, and 86 and the second linear portions 42, 82, and 87 in the magnetization directions M1 and M2. Thus, demagnetization can be more greatly suppressed by reducing the thicknesses d3 and d4 of the third linear portions 43, 83, and 88 and the fourth linear portions 44, 84, and 89 than by reducing the thicknesses d1 and d2 of the first linear portions 41, 81, and 86 and the second linear portions 42, 82, and 87. In this manner, motor characteristics can be enhanced. As a result, motor characteristics can be enhanced with reduction of costs for the permanent magnets 4, 8, and 8A.

The rotor 1 according to a second aspect of the technique of the present disclosure, in the rotor 1 of the first aspect, the third linear portion 43 is connected to an end of the first linear portion 41 closer to the rotation axis A, and the fourth linear portion 44 is connected to an end of the third linear portion 43 and connected to an end of the second linear portion 42 closer to the rotation axis A. A cross-sectional shape orthogonal to the rotation axis A of the permanent magnets 4 is a W shape.

With this configuration, as compared to a case where the cross-sectional shape of the permanent magnets is a continuous linear shape, for example, the surface area of the permanent magnets 4 can be further increased. Accordingly, a torque of the motor 100 increases, and motor characteristics are enhanced.

The rotor 1 according to a third aspect of the technique of the present disclosure, in the rotor 1 of the second aspect, the rotor core 3 has the gap 48 obtained by removing a portion of the connection portion 47 between the third linear portion 43 and the fourth linear portion 44 closer to the rotation axis A in the radial direction.

With this configuration, the gap 48 is located in a portion in which magnetic fluxes from the stator 6, the first linear portion 41, and the second linear portion 42 as magnetic fluxes flowing in directions that cancel a magnetic force are easily concentrated, and thus, local demagnetization can be suppressed. In this manner, motor characteristics can be enhanced.

In the rotor 1 according to a fourth aspect of the technique of the present disclosure, in the rotor 1 according to the first aspect, the first linear portions 81 and 86, the second linear portions 82 and 87, the third linear portions 83 and 88, and the fourth linear portions 84 and 89 are separated from each other.

With this configuration, since the linear portions are separated, the shape of the linear portions is simplified, and thus, the permanent magnets 8 and 8A can be easily fabricated.

The rotor 1 according to a fifth aspect of the technique of the present disclosure, in the rotor 1 according to the fourth aspect, the first linear portion 86 and the second linear portion 87 are shared with an adjacent permanent magnet 8A in the circumferential direction.

With this configuration, the number of parts of the permanent magnet 8A can be reduced.

The rotor 1 according to a sixth aspect of the technique of the present disclosure, in the rotor 1 of the second or third aspect, the connection portion 45 between the first linear portion 41 and the third linear portion 43 and the connection portion 46 between the second linear portion 42 and the fourth linear portion 44 coincide with the inner peripheral surface 3*b* of the rotor core 3.

With this configuration, since the rotor 3 is not present between the connection portions 45 and 46 and the shaft 5, a so-called q-axis inductance decreases, and a power factor increases. In addition, the arrangement area of the permanent magnets 4 is large in the radial direction of the rotor core 3, and the surface area of the permanent magnets 4 can be further increased. Accordingly, motor characteristics can be enhanced.

The rotor 1 according to a seventh aspect of the technique of the present disclosure, the rotor 1 of the sixth aspect further includes the shaft 5 of a magnetic material inserted in the rotor core 3 coaxially with the rotation axis A.

With this configuration, as compared to a case where the shaft is not a magnetic material, the magnetic fluxes H1 and H2 from the third linear portion 43 and the fourth linear portion 44 pass through the shaft 5 and easily flow into the third linear portion 43 and the fourth linear portion 44 of another permanent magnet 4. Accordingly, the magnetic flux density of the permanent magnets 4 increases. Accordingly, a magnet torque increases, and motor characteristics are enhanced.

The rotor 1 according to an eighth aspect of the technique of the present disclosure, in the rotor 1 according to any one of the first through seventh aspects, the permanent magnets 4, 8, and 8A are bonded magnets.

With this configuration, the permanent magnets 4, 8, and 8A are easily shaped in desired shapes.

The rotor 1 according to a ninth aspect of the technique of the present disclosure, in the rotor 1 according to any one of the first through eighth aspects, the magnetization directions M1 and M2 of the first linear portions 41, 81, and 86 and the second linear portions 42, 82, and 87 are respectively set in the thickness directions of the first linear portions 41, 81, and 86 and the second linear portions 42, 82, and 87. The magnetization directions M3 and M4 in the third linear portions 43, 83, and 88 and the fourth linear portions 44, 84, and 89 are set in the radial directions.

This configuration increases effectiveness of reducing the thicknesses d3 and d4 of the third linear portions 43, 83, and 88 and the fourth linear portions 44, 84, and 89.

The motor 100 according to a tenth aspect of the technique of the present disclosure includes: the cylindrical stator 6; and the rotor 1 according to any one of the first through ninth aspects located in the stator 6.

The method for manufacturing the rotor 1 according to an eleventh aspect of the technique of the present disclosure is a method for manufacturing the rotor 1 according to any one of first through seventh aspects in which the permanent magnets 4, 8, and 8A are bonded magnets. This manufacturing method includes: preparing the rotor core 3 having the arrangement holes 31, 32, 33, 34, and 35 for placing the bonded magnets; injecting a material for the bonded magnets into each of the arrangement holes 31, 32, 33, 34, and 35 of the rotor core 3, thereby injection molding the bonded magnets in a non-magnetized state; and in injection molding the bonded magnets in a non-magnetized state, placing orientation magnetic flux generators individually corresponding to the arrangement holes 31, 32, 33, 34, and 35 at the outer side and the inner side of the rotor core 3 and orienting the bonded magnets in a non-magnetized state.

The method for manufacturing the rotor according to a twelfth aspect of the technique of the present disclosure is the method for manufacturing the rotor 1 according to any one of the first through ninth aspects. This manufacturing method includes: preparing the rotor core 3 having the arrangement holes 31, 32, 33, 34, and 35 for placing the permanent magnets 4, 8, and 8A; placing the permanent magnets 4, 8, and 8A in a non-magnetized state in the respective arrangement holes 31, 32, 33, 34, and 35 of the rotor core 3; and after placing the permanent magnets 4, 8, and 8A in a non-magnetized state, placing the magnetization magnetic flux generators corresponding to the respective arrangement holes 31, 32, 33, 34, and 35 at the outer side and the inner side of the rotor core 3 and magnetizing the permanent magnets 4, 8, and 8A in a non-magnetized state.

With these configurations, in a manner similar to the rotor 1 according to the first aspect, motor characteristics can be enhanced with reduction of costs for the permanent magnets 4, 8, and 8A.

REFERENCE SIGNS LIST

100 motor
1 rotor
3 rotor core
3*b* inner peripheral surface
31 arrangement hole
32, 33, 34, 35 arrangement hole
4, 8, 8A permanent magnet
41 first linear portion
42 second linear portion
43 third linear portion
44 fourth linear portion
45 connection portion
46 connection portion
47 connection portion
48 gap
5 shaft
6 stator
8, 8A permanent magnet
81, 86 first linear portion
82, 87 second linear portion
83, 88 third linear portion
84, 89 fourth linear portion
91 to 94 outer magnet (orientation magnetic flux generator, magnetization magnetic flux generator)
96 to 99 inner magnet (orientation magnetic flux generator, magnetization magnetic flux generator)
A rotation axis
d1 to d4 thickness
M1 to M4 magnetization direction

The invention claimed is:

1. A rotor comprising:
a rotor core having a rotation axis; and
permanent magnets arranged in a circumferential direction centered on the rotation axis in the rotor core, the permanent magnets having alternately different magnetic poles in the circumferential direction, wherein
each of the permanent magnets includes, in a cross section orthogonal to the rotation axis,
a first linear portion and a second linear portion arranged in the circumferential direction and extending from an outer periphery side of the rotor core toward the rotation axis;
a third linear portion located between the first linear portion and the second linear portion in the circumferential direction and extending obliquely with respect to a radial direction centered on the rotation axis and separately from the rotation axis from an end of the first linear portion closer to the rotation axis, and
a fourth linear portion located between the second linear portion and the third linear portion in the circumferential direction and extending obliquely with respect to the radial direction and separately from the rotation axis from an end of the second linear portion closer to the rotation axis,
a thickness of at least one of the third linear portion or the fourth linear portion is smaller than a thickness of each of the first linear portion and the second linear portion,
the third linear portion is connected to the end of the first linear portion closer to the rotation axis,
the fourth linear portion is connected to an end of the third linear portion and connected to the end of the second linear portion closer to the rotation axis,
a cross-sectional shape of each of the permanent magnets orthogonal to the rotation axis is a W shape, and
the rotor core includes a gap obtained by removing a portion of a connection portion between the third linear portion and the fourth linear portion closer to the rotation shaft in the radial direction.

2. The rotor according to claim 1, wherein
the permanent magnets are bonded magnets.

3. The rotor according to claim 1, wherein
a magnetization direction in the first linear portion is set in a thickness direction of the first linear portion,
a magnetization direction in the second linear portion is set in a thickness direction of the second linear portion, and
magnetization directions in the third linear portion and the fourth linear portion are set in the radial direction.

4. A motor comprising:
a cylindrical stator; and
the rotor according to claim 1 located in the stator.

5. A rotor manufacturing method for manufacturing the rotor according to claim 1, the permanent magnets being bonded magnets, the method comprising:
preparing the rotor core having arrangement holes for placing the bonded magnets;
injecting a material for the bonded magnets into each of the arrangement holes of the rotor core, thereby injection molding the bonded magnets in a non-magnetized state; and
in injection molding the bonded magnets in a non-magnetized state, placing orientation magnetic flux generators individually corresponding to the arrangement holes at an outer side and an inner side of the rotor core and orienting the bonded magnets in a non-magnetized state.

6. A rotor manufacturing method for manufacturing the rotor according to claim 1, the method comprising:
preparing the rotor core having arrangement holes for placing the permanent magnets;
placing the permanent magnets in a non-magnetized state in the respective arrangement holes of the rotor core; and
after placing the permanent magnets in a non-magnetized state, placing magnetization magnetic flux generators corresponding to the respective arrangement holes at an outer side and an inner side of the rotor core and magnetizing the permanent magnets in a non-magnetized state.

7. A rotor comprising:
a rotor core having a rotation axis; and
permanent magnets arranged in a circumferential direction centered on the rotation axis in the rotor core, the permanent magnets having alternately different magnetic poles in the circumferential direction, wherein
each of the permanent magnets includes, in a cross section orthogonal to the rotation axis,
a first linear portion and a second linear portion arranged in the circumferential direction and extending from an outer periphery side of the rotor core toward the rotation axis;

a third linear portion located between the first linear portion and the second linear portion in the circumferential direction and extending obliquely with respect to a radial direction centered on the rotation axis and separately from the rotation axis from an end of the first linear portion closer to the rotation axis, and a fourth linear portion located between the second linear portion and the third linear portion in the circumferential direction and extending obliquely with respect to the radial direction and separately from the rotation axis from an end of the second linear portion closer to the rotation axis, a thickness of at least one of the third linear portion or the fourth linear portion is smaller than a thickness of each of the first linear portion and the second linear portion, the third linear portion is connected to the end of the first linear portion closer to the rotation axis, the fourth linear portion is connected to an end of the third linear portion and connected to the end of the second linear portion closer to the rotation axis, a cross-sectional shape of each of the permanent magnets orthogonal to the rotation axis is a W shape, and a connection portion between the first linear portion and the third linear portion and a connection portion between the second linear portion and the fourth linear portion both coincide with an inner peripheral surface of the rotor core such that the rotor core is not interposed between the connection portions and the inner peripheral surface of the rotor core.

8. The rotor according to claim 7, further comprising a shaft of a magnetic material inserted in the rotor core coaxially with the rotation axis.

* * * * *